United States Patent [19]

Privalov et al.

[11] 3,899,918

[45] Aug. 19, 1975

[54] DIFFERENTIAL MICROCALORIMETER

[76] Inventors: Petr Leonidovich Privalov, mikroraion V, 29, kv. 38; Pavel Semenovich Makurin, mikroraion V, 22, kv. 46; Valerian Valerievich Plotnikov, mikroraion G, 9, kv. 47; Vladimir Vasilievich Koryagin, mikroraion V, 8, kv. 23; Viktor Sergeevich Polpudnikov, mikroraion V, 24, kv. 5; Georgy Pavlovich Stepanjuk, mikroraion V, 25, kv. 16, all of Puschino Moskovskoi oblasti, U.S.S.R.

[22] Filed: Mar. 5, 1973

[21] Appl. No.: 338,229

[52] U.S. Cl. ............................................. 73/15 B
[51] Int. Cl. ...................... G01k 17/00; G01h 25/20
[58] Field of Search ........................ 73/15 B, 190 R

[56] References Cited
UNITED STATES PATENTS

| | | | |
|---|---|---|---|
| 3,267,728 | 8/1966 | Solomons | 73/190 |
| 3,675,465 | 7/1972 | Sommer et al. | 73/15 |
| 3,726,644 | 4/1973 | Desnoyers et al. | 73/190 |

OTHER PUBLICATIONS

Danforth et al., "Differential Calorimetry of Thermally Induced Process in Solution" in Rev. of Sci. Instr. 38 No. 4, 4/67, pg. 484–487.

Tsong et al., "A Calorimetric Study of Thermally Induced Conformational Transitions of Ribonucleas A etc." in Biochemistry, Vol. 9 No. 13, 1970, 2666–2677.

Gill et al., "Differential Heat Capacity Calorimeter for Polymer Transition Studies" in Rev. of Sci. Inst. Vol. 36, No. 3, 3/65, pgs. 274–276.

*Primary Examiner*—Herbert Goldstein
*Attorney, Agent, or Firm*—Holman & Stern

[57] ABSTRACT

A differential microcalorimeter is provided with a shield which encloses the sample and reference calorimetric chambers with thermal sensing and heating elements secured on the surfaces of the chambers and connected electrically with thermoregulators and at least one heat shunt provided in relation to the sample and reference calorimetric chambers so that it isolates the working volumes of the chambers. The above heat shunt is provided with a thermoregulator coupled electrically with it and with one of the above calorimetric chambers. The sample and reference calorimetric chambers are fashioned as capillary tubes having inlets and outlets which are outside the shield of the calorimetric unit.

1 Claim, 4 Drawing Figures

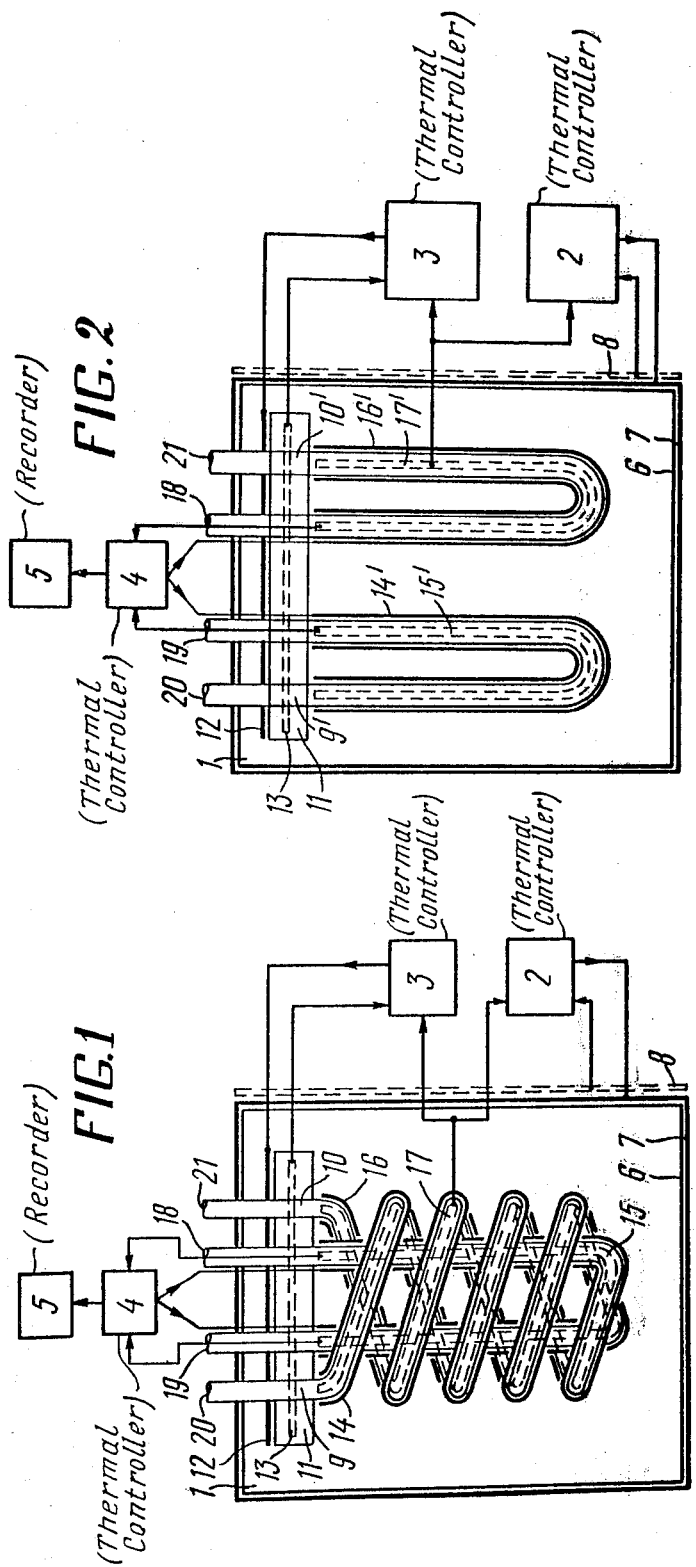

DIFFERENTIAL MICROCALORIMETER

BACKGROUND OF THE INVENTION

The present invention relates generally to devices for determining the thermophysical characteristics of liquid substances and more particularly it relates to differential microcalorimeters used to measure thermal effects, i.e., the amounts of thermal energy liberated or absorbed in heated liquid samples under study (having, specifically, increased or variable viscosity) during physical or chemical changes therein.

Known in the art are differential microcalorimeters provided with a calorimetric unit with a shield enclosing the sample and reference calorimetric chambers with thermal sensing and heating elements secured on their surfaces, the chambers being electrically connected to thermoregulators (cf., "A Calorimetric Study of Thermally Induced Conformational Transitions of Ribonuclease A and Certain of Its Derivatives", 1970, Biochemistry, 13, 2666).

The calorimetric chambers of the above-mentioned microcalorimeters, fashioned as a closed vessel featuring a small ratio of the external surface to the volume, do not permit uniform heating of the whole volume of a liquid under study in the sample calorimetric chamber and a reference liquid in the standard calorimetric chamber for two reasons: firstly, uniform spacing of the heating elements on their spherical surface is technologically difficult to achieve and, secondly, the spherical volume of the liquid under study and that of the reference liquid predetermine the emergence of temperature gradients, which degrades the accuracy and reliability of measurements.

Furthermore, during experiments with the above-mentioned microcalorimeters it is necessary to open the shield and take out the sample and reference calorimetric chambers to fill them with respective liquids each time a new experiment is prepared, which complicates their operation and degrades the reproducibility of the results obtained.

SUMMARY OF THE INVENTION

It is an object of the present invention to provide a differential microcalorimeter ensuring uniform heating of a liquid under study and a reference liquid which may have elevated or variable viscosity.

Another object of the present invention is to provide a differential microcalorimeter ensuring also a clearcut thermal isolation of the working volumes in the sample and reference calorimetric chambers and their temperature control.

A further object of the invention is to provide a microcalorimeter permitting the sample and reference calorimetric chambers to be filled with liquids and emptied without opening the calorimetric unit of the proposed instrument.

These objects are achieved by provision that in the differential microcalorimeter whose calorimetric unit shield accomodates the sample and reference calorimetric chambers with thermal sensing and heating elements, secured on the surfaces of the chambers and electrically coupled with thermoregulators according to the invention, there is at least one heat shunt arranged in relation to the sample and reference calorimetric chambers so that it isolates the working volumes of these chambers and has a thermoregulator electrically coupled with the heat shunt and with one of the calorimetric chambers, whereas the sample and reference calorimetric chambers are fashioned as capillary tubes having inlets and outlets which are arranged outside the screening shell of the above calorimetric unit.

The aforementioned peculiar features of the construction of the proposed differential microcalorimeter help ensure uniform heating of the volumes of the liquid being studied and of the reference liquid respectively in the sample and reference calorimetric chambers, the volumes being distinctly isolated by the above heat shunt, which, in its turn, helps raise the sensitivity and accuracy of the proposed device, whereas the inlets and outlets of the calorimetric chambers outside the shield of the calorimetric unit permit the calorimetric chambers to be easily filled or drained without the necessity of dismantling any of the calorimetric unit parts.

BRIEF DESCRIPTION OF THE DRAWINGS

The invention will be more apparent from the description of its exemplary embodiments, with reference to the appended drawings, wherein:

FIG. 1 is a schematic diagram of the proposed differential microcalorimeter;

FIG. 2 is a schematic diagram of another exemplary embodiment of same;

DETAILED DESCRIPTION OF THE PREFERRED EMBODIMENTS

Figure 4:
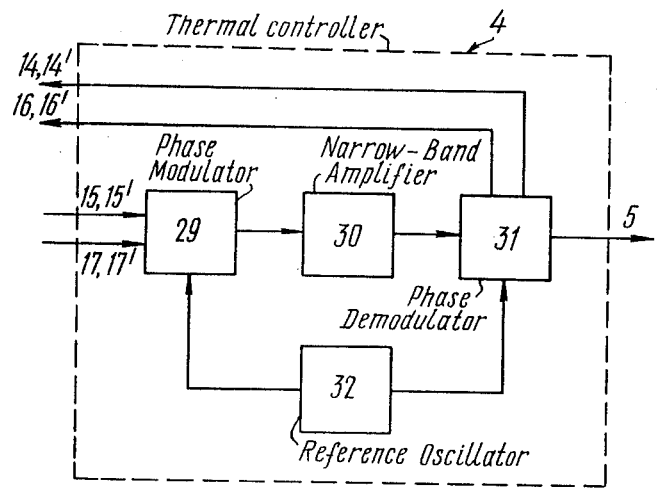
FIG. 4 is a block-diagram of another thermoregulator of the same microcalorimeter.

The proposed differential microcalorimeter is described, herein below as a differential adiabatic scanning microcalorimeter in two of its exemplary embodiments.

According to the first exemplary embodiment, the microcalorimeter comprises a calorimetric unit 1 (FIG. 1) coupled electrically with thermoregulators 2, 3 and 4, the latter of which being connected, by one of its outputs, to a recorder 5 for recording the results of measurements.

The above calorimetric unit 1 is enclosed by a shield 6 fitted with a heating element 7 and a thermal sensing element 8 connected to one of the inputs of the thermoregulator 2 whose output is connected to the heating element 7.

Accomodated inside the screening shell 6 are the sample 9 and reference 10 calorimetric chambers, intended for a liquid to be studied and a reference liquid, and a heat shunt 11 arranged in relation to the chambers 9 and 10 so that it isolates the working volumes of these chambers. The shunt 11 is provided with a heating element 12 and a thermal sensing element 13 connected to one of the inputs of the thermoregulator 3 whose output is connected to the heating element 12.

The sample calorimetric chamber 9 has a heating element 14, secured throughout the measuring portion of its surface isolated by the above heat shunt 11, and a thermal sensing element 15 connected to one of the inputs of the thermoregulator 4 whose other output is connected to the heating element 14.

The reference calorimetric chamber 10 is also provided with a heating element 16, secured throughout the measuring portion of its surface isolated by the above heat shunt 11, the element 16 being connected to the third of the outputs of the thermoregulator 4, and a thermal sensing element 17 connected to the other inputs of the thermoregulators 2, 3 and 4, respectively.

The sample 9 and reference 10 calorimetric chambers are fashioned as capillary tubes whose inlets 18 and 19 and outlets 20 and 21, respectively are arranged outside the shield 6 of the calorimetric unit 1, which permits easy and unimpeded recharge of both sample and reference liquids.

The above capillary tubes have an intricate shape: portions of the tubes, from the inlets 18 and 19 to their middle, are helical, which results in a marked increase in the sensitivity of the proposed microcalorimeter. This shape of calorimetric chambers 9 and 10 in the described embodiment requires one heat shunt 11 to be positioned in close proximity to the inlets 18 and 19 and outlets 20 and 21 of the above chambers 9 and 10 and to envelop the inlet and outlet portions of the chambers, to provide isolation, as described herein above, the working volumes of these chambers.

The second exemplary embodiment (FIG. 2) of the proposed differential microcalorimeter is similar to the device of the first exemplary embodiment (FIG. 1).

The difference between the two versions is that, for the sake of simplicity and cheapness, the sample 9' (FIG. 2) and reference 10' calorimetric chambers of the microcalorimeter have a simple U-shaped form with heating elements 14' and 16' and thermal sensing elements 15' and 17' secured respectively throughout the measuring portion of their surfaces, which is isolated by the heat shunt 11.

In case the sample and reference calorimetric chambers are fashioned as straight capillary tubes, for isolation of the working volume of the chambers, it is necessary to provide two heat shunts in the microcalorimeter in close proximity to the inlets and outlets of the calorimetric chambers, respectively.

Figure 3:
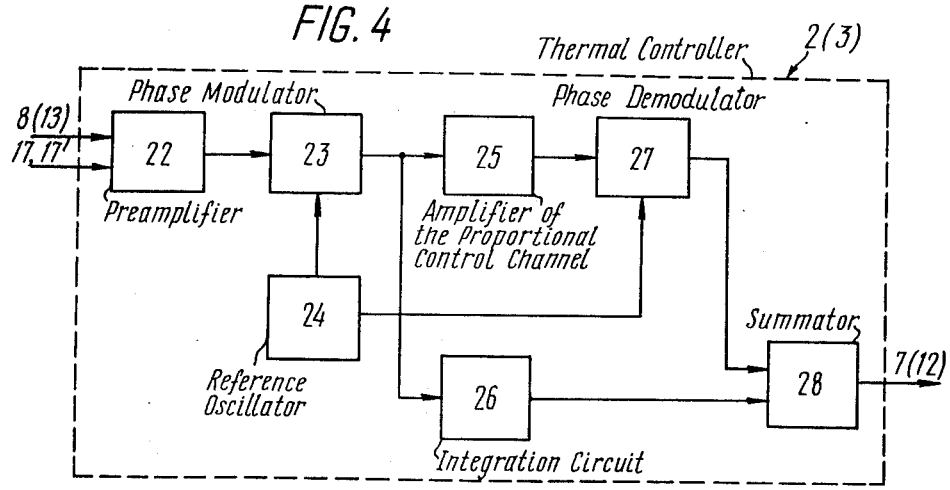
FIG. 3 is a block-diagram of one of the thermoregulators of the differential microcalorimeter.

In both of the exemplary embodiments of the proposed differential microcalorimeter, the thermoregulators 2 and 3 are of similar design and the block diagram of one of them, specifically, the thermoregulator 2, is shown in FIG. 3 (given in parentheses on the drawing and in the description which follows are numerical designations referring to the thermoregulator 3).

The thermoregulator 2 (3) comprises a transistorized pre-amplifier 22 one of the inputs of which is connected to the thermal sensing element 17, for the first exemplary embodiment, and to the thermal sensing element 17', for the second exemplary embodiment, and the other input to the thermal sensing element 8 (13), its output being connected to one of the inputs of transistor phase modulator 23; connected to the other input of the phase modulator is a reference generator 24 made as a transistor blocking generator. The output of the phase modulator 23 is connected to the amplifier 25 of a transistorized proportional control channel and to an integrating member 26 made of semiconductor amplifying elements and an AC motor whose shaft is linked with a DC-fed potentiometer. The output of amplifier 25 is connected to one of the inputs of transistor phase demodulator 27 whose other input is connected to the reference generator 24. The outputs of the integrating member 26 (specifically, its potentiometer) and of the phase demodulator 27 are connected to a summation circuit 28 which is a transistor emitter follower, the output of the summation circuit being connected to the heating element 7 (12).

The thermoregulator 4 (FIG. 4) is also the same in both of the exemplary embodiments of the microcalorimeter according to the invention.

The thermoregulator 4 comprises a transistor phase modulator 29, both of the inputs of the latter being connected to the thermal sensing elements 15 and 17, for the first exemplary embodiment, and to the thermal sensing elements 15' and 17', for the second exemplary embodiment. The output of the phase modulator 29 is connected to the input of a narrow-band amplifier 30 made of transistors and an RC filter, the output of the amplifier 30 being connected to one of the inputs of a transistor phase demodulator 31. Connected to one input of modulator 29 and one input of demodulator 31 is a reference generator 32 made as a transistor blocking generator, the narrow-band amplifier 30 being tuned to the frequency of the reference generator 32. Two of the outputs of the demodulator 31 are connected to the heating elements 14 and 16, for the first exemplary embodiment, and to the heating elements 14' and 16', for the second exemplary embodiment, respectively, whereas the third output is connected to the recorder 5.

Described herein above is an exemplary embodiment of the circuit diagram of a microcalorimeter, wherein the inputs of the thermoregulators are connected to a thermal sensing element of the reference chamber.

Yet another exemplary emobodiment of the circuit diagram of the microcalorimeter is practical, wherein the thermoregulator inputs are connected to the thermal sensing element of the sample chamber or to both the thermal sensing elements of the chambers.

The principle of operation of the proposed differential microcalorimeter according to the first exemplary embodiment of the invention is similar to that of the differential microcalorimeter according to the second exemplary embodiment and is described herein below with reference to the first exemplary embodiment.

The sample calorimetric chamber 9 (FIG. 1) is filled with a liquid to be studied and the reference calorimetric chamber 10 with a reference liquid.

The thermoregulator 4 effects the heating of the liquids in the chambers 9 and 10 at the same rate in accordance with a preset program of experiment. This heating is done by supplying power to the heating elements 14 and 16 of the chambers 9 and 10 so that their temperature is increased linearly with time at a preset rate (temperature scanning).

The temperature of the shunt 11 is maintained equal to that of the chamber 10 with the aid of thermoregulator 3 whose inputs are fed with a signal from the thermal sensing element 17 of chamber 10 and a signal from the thermal sensing element 13 of shunt 11. When a temperature difference arises between the shunt 11 and reference chamber 10, it is reduced to zero by the thermoregulator 3 producing a corresponding action on the heating element 12 of the shunt 11. The thermoregulator 2 monitors the temperatures of reference chamber 10 and shield 6 by the signals coming from the related thermal sensing elements 17 and 8 and when a difference occurs between the two temperature values, it nullifies it by acting upon the heating element 7 of shield 6. Thus, the thermoregulators 2 and 3 provide adiabatic conditions for the process being studied.

At the moment the thermal effect, i.e., liberation or absorption of heat, takes place, the temperature in the sample chamber 9 becomes different from that of the reference chamber 10, as a result of which the signals coming to the inputs of thermoregulator 4 from the thermal sensing elements 15 and 17 become unequal. The thermoregulator 4 responds to the emerging difference signal by varying the electric power introduced into the heating element 14 of the sample chamber 9 so as to balance the thermal effect. The compensation energy which is a measure of the thermal effect is registered by the recorder 5.

The proposed differential microcalorimeter ensures increased sensitivity and accuracy of measurements, eliminates the necessity of dismantling the calorimetric unit for filling the calorimetric chambers with the sample and reference liquids before each successive experiment, which contributes greatly to the reproducibility of results. Another advantage of the microcalorimeter is the possibility of investigating liquids possessing elevated and variable viscosity with greater accuracy than that ensured by the known types of microcalorimeters.

What we claim is:

1. A differential microcalorimeter comprising: a calorimetric unit including a shield; a sample calorimetric chamber provided with a heating element and a heat sensing element, and made as a capillary tube inserted inside said shield so that the inlet and outlet of said capillary tube, through which said chamber is respectively filled and emptied are located outside said shield; a reference calorimetric chamber provided with a heating element and a heat sensing element, and made as a capillary tube inserted inside said shield so that the inlet and outlet of said capillary tube, through which said chamber is respectively filled and emptied, are located outside said shield; at least one heat shunt comprising an element made of a material having a high heat conductivity and having a heater, said capillary tubes extending through said shunt and having good thermal contact therewith, each of said capillary tubes being divided by said shunt into a non-working portion extending beyond the shunt to form said inlets and outlets of said capillary tubes through which each of said chambers are filled and emptied, and a working volume portion that is not enclosed by said shunt and is a continuation of said non-working portion, said heating element and said heat sensing element of each calorimetric chamber being disposed on the surface of its respective said working volume portion; a heat sensing element of said heat shunt; a heat sensing element of said shield; a heating element of said shield; a first thermoregulator with two inputs and one output, said inputs being connected to at least one of said heat sensing elements of said calorimetric chambers and to said heat sensing element of said shield, and the output being connected to said heating element of said shield; a second thermoregulator with two inputs and one output, one of the inputs being connected to the same heat sensing elements of said calorimetric chambers as the first thermoregulator, the other input being connected to said heat sensing element of said heat shunt, and the output being connected to said heating element of said heat shunt; a third thermoregulator with two inputs and three outputs, said inputs being connected to the respective heat sensing elements of said chambers, and two of said three outputs being connected to said heating elements of said chambers, and a recorder connected to said third output of said third thermoregulator for recording the results of measurements.

* * * * *